G. D. FORBES.
SURGICAL CLAMP.
APPLICATION FILED AUG. 28, 1917.
1,275,414.
Patented Aug. 13, 1918.
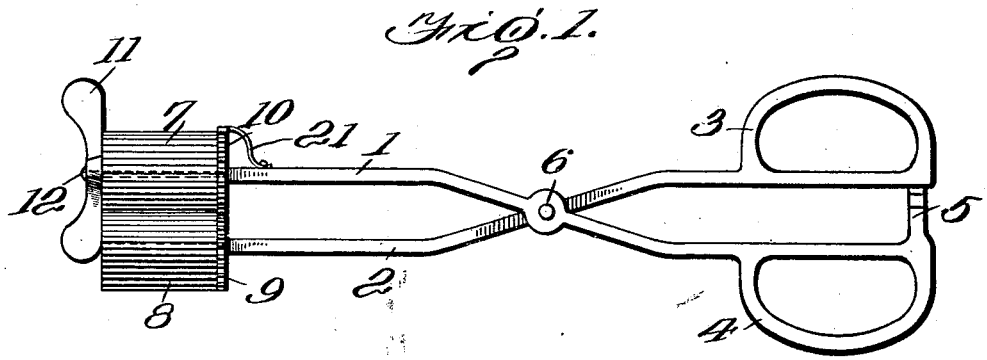
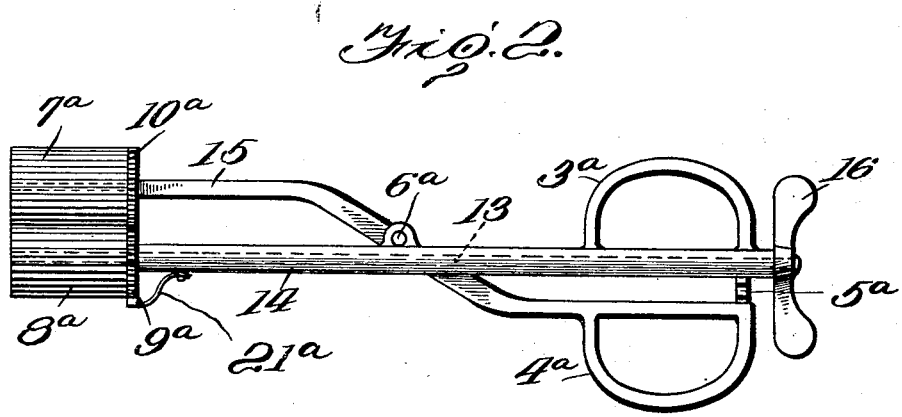
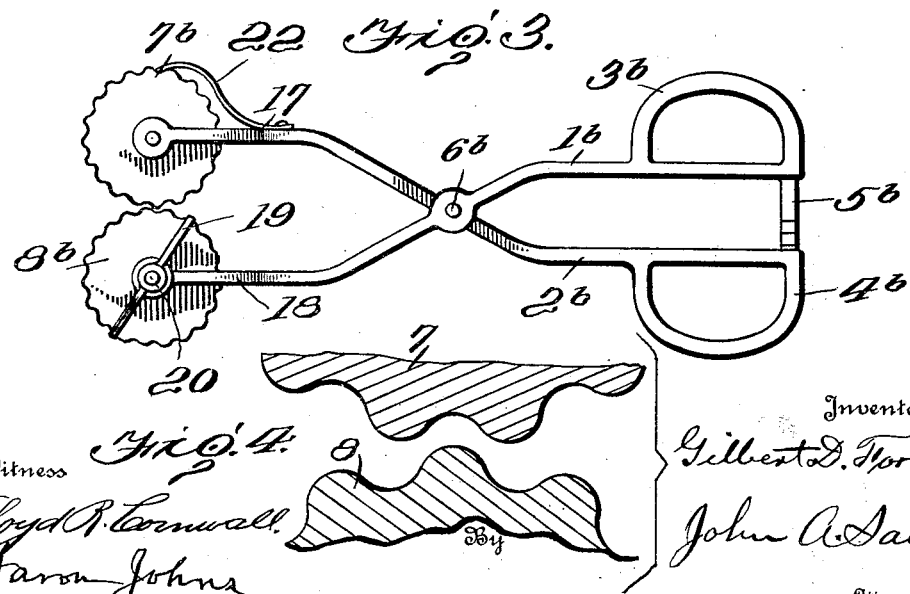
Witness
Floyd R. Cornwall
Aaron Johns
Inventor
Gilbert D. Forbes
By John A. Saul
Attorney

UNITED STATES PATENT OFFICE.

GILBERT D. FORBES, OF KENDALL, NEW YORK.

SURGICAL CLAMP.

1,275,414. Specification of Letters Patent. Patented Aug. 13, 1918.

Application filed August 28, 1917. Serial No. 188,569.

*To all whom it may concern:*

Be it known that I, GILBERT D. FORBES, a citizen of the United States, residing at Kendall, in the county of Orleans and State of New York, have invented certain new and useful Improvements in Surgical Clamps, of which the following is a specification.

My invention relates to surgical clamps, and more particularly to clamps used in obstetrics, for clamping the umbilical cord at birth, as well as for use in intestinal operations, and the like.

It has for its object the construction of a device that will grasp the umbilical cord and by the simple manipulation of the rollers will completely strip out the jelly of Wharton, and in the case of abdominal operations will strip out the contents of the intestine, and thus prevent infection. A further object is to construct a device that will be simple in construction, will have but few parts, will be durable, can be easily manipulated, and can be cheaply manufactured.

In the drawings forming a part of this specification, and in which like symbols of reference represent corresponding parts in the several views:

Figure 1 is a longitudinal view of the device;

Fig. 2 a modification of the same, showing the operation of the rollers from the handle of the instrument;

Fig. 3 another modification, in which the rollers are transverse to the arms; and, Fig. 4 an enlarged sectional view of the rollers.

In the drawings, the numerals 1 and 2 designate the levers or arms of the device; 3 and 4 the handles of the same; and 5 a rack for locking it when in use. 6 is the rivet connecting the arms of the device; 7 and 8 the rollers for grasping the umbilical cord, or the like; 9 and 10 are gears connected to the rollers for the purpose of rotating the same; 11 a wing nut for operating the rollers; and 12 the pin connecting the nut to the roller.

21 is a spring or catch to engage a gear and hold the same against rotation, when the instrument is in its operative position, grasping the umbilical cord or other part upon which it is used. The action of this and the other springs shown in the modifications is in the nature of a brake.

13 in the modification, is a rod housed in the cylindrical arm 14, and adapted when rotated to operate the rollers. 15 is the other arm of the device; 6$^a$ a rivet of the same; and 16 a wing nut on the end of the shaft for operating the same; 7$^a$ and 8$^a$ rollers for the same; 3$^a$ and 4$^a$ hand pieces of the device; 21$^a$ a spring to hold the roller after rotation; and 5$^a$, rack on the handle.

In the modification shown in Fig. 3 the rollers 7$^b$ and 8$^b$ have corrugations or teeth that normally mesh with each other; and the arms 17 and 18 are formed with greater angles to conform to the modification. 6$^b$ is a rivet connecting the arms; 19 a wing nut for operating the rollers; 20 a shaft supporting a wing nut; 22 a spring to hold the rollers after rotation; 3$^b$ and 4$^b$ the hand pieces; and 5$^b$ the rack for locking the arms. 1$^b$ and 2$^b$ are the rear portion of the arms of the device, showing the angle of the same.

The operation of the device will be apparent from the foregoing description: The clamp consists of two arms, not greatly different from those in common use fitted with a latch or catch permitting the clamp to be forced down as tight as may be necessary, terminating in cylindrical ends which carry grooved or roughened rollers, each roller having at its end a gear or cog-wheel with teeth sufficiently deeply cut as to permit a limited amount of adjustment in the approximation of the two rollers without affecting the mesh of the gear teeth; one of the rollers having a wing nut or other means of rotating it by hand and through the gears above mentioned rotating the second rollers. In the modification shown in Fig. 2 the roller is rotated from the wing nut on the rod 13.

After birth the cord is clamped at the base close to the child's abdomen, then by turning the rollers by means of the wing nut, or milled head, the rollers are rolled along the cord forcing ahead of them the jelly. At the proper distance the clamp is forced down tight, the cord tied and cut leaving the clamp on the maternal end of the cord until the delivery of the placenta. Hemorrhages from the cord are thus prevented, the incomplete expression of the jelly of Wharton being one of the common causes of such hemorrhages. By stripping out the jelly later shrinkage is prevented, the stripped cord is less bulky, and comes off sooner.

Having now fully described my invention, what I claim as new and desire to secure by Letters Patent, is:—

1. In a device of the character described, a plurality of arms having pivotal connection, rollers carried by said arms, and means connected with the rollers for rotating the same.

2. In a device of the character described, a plurality of arms having pivotal connection, handles to manipulate the same, rollers carried by said arms, means for rotating the rollers, and gear connections between the rollers so that motion can be imparted from one to the other.

3. A surgical clamp, comprising a plurality of arms, grooved rollers carried by the same, means for revolving the rollers, means for braking the rollers when operated, and means for locking the arms when operated.

4. A surgical clamp, comprising a plurality of arms having a hinged relation to each other, corrugated rollers carried by said arms, a winged nut for operating the rollers, and means for locking the device when operated.

In testimony whereof I affix my signature in presence of two witnesses.

GILBERT D. FORBES.

Witnesses:
 LILLIAN B. FORBES,
 ANNIE E. CLARK.

Copies of this patent may be obtained for five cents each, by addressing the "Commissioner of Patents, Washington, D. C."